L. B. TEBEAU.
HEATING DEVICE FOR LAMP CHIMNEYS.
APPLICATION FILED DEC. 8, 1919.

1,342,359.

Patented June 1, 1920.

Inventor:
Lewis B. Tebeau,
by his attorney,
Charles N. Gooding.

UNITED STATES PATENT OFFICE.

LEWIS B. TEBEAU, OF CONCORD, NEW HAMPSHIRE.

HEATING DEVICE FOR LAMP-CHIMNEYS.

1,342,359.  Specification of Letters Patent.  Patented June 1, 1920.

Application filed December 8, 1919. Serial No. 343,336.

*To all whom it may concern:*

Be it known that I, LEWIS B. TEBEAU, a citizen of the United States, residing at Concord, in the county of Merrimack and State of New Hampshire, have invented new and useful Improvements in Heating Devices for Lamp-Chimneys, of which the following is a specification.

This invention relates to a heating device adapted to be used in connection with kerosene lamps by placing the same upon the top of the lamp chimney.

The object of the invention is to provide a cheap and simple device whereby heat from a lamp may be utilized both for cooking articles of food and for heating the room in which it may be placed.

The invention consists in the combination and arrangement of parts set forth in the following specification and particularly pointed out in the claims thereof.

Referring to the drawings.

Figure 1:
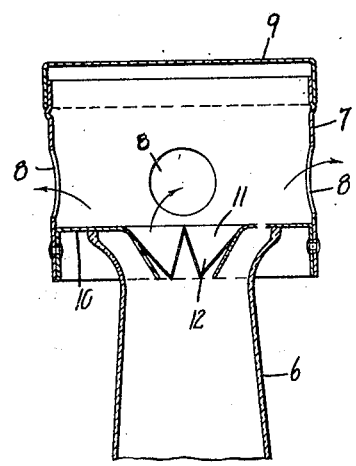
Figure 1 is a sectional elevation of one form of my invention showing the same in connection with a portion of a lamp chimney.

In the drawings, referring to Fig. 1, 6 is a portion of a lamp chimney, 7 is a hollow cylinder provided with a plurality of holes 8 and having a cover 9. A horizontal partition 10 extends across the interior of the cylinder 7 below the holes 8, said partition being provided with a centrally disposed opening 11 which is surrounded by downwardly projecting prongs 12; said prongs being formed preferably by striking them up out of the material forming the horizontal partition 10. The prongs 12 serve a two-fold purpose, namely, as means for centering the cylinder upon the lamp chimney and also as baffle plates to break up and spread the heated gases as they pass from the chimney into the cylinder 7.

Figure 2:
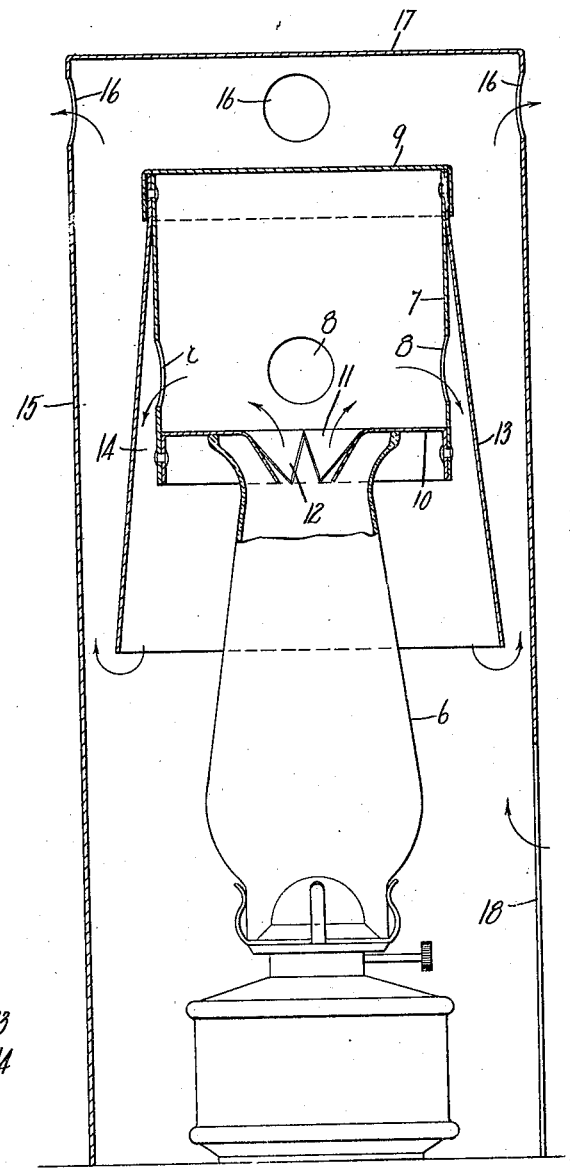
Fig. 2 is a sectional elevation of another embodiment of my invention also showing in connection therewith a portion of a lamp chimney.

Referring now to Fig. 2: the cylinder 7 is the same as in the form of my invention illustrated in Fig. 1 and has fastened thereto a frusto-conical casing 13 which surrounds the cylinder 7 and is fastened at its upper end to the upper end of said cylinder, thereby forming between the walls of said casing and cylinder a chamber 14. The lower end of the casing 13 preferably projects to a substantial distance below the bottom of the cylinder 7. An outer casing 15 surrounds the cylinder 7 and the frusto-conical casing 13; the lower portion of said outer casing projecting preferably to a substantial extent below the bottom of the frusto-conical casing 13 and being adapted to rest upon a stationary support such as the floor of the room in which the device may be located. The outer casing 15 is provided adjacent its upper end with holes 16 and has a cover 17 which projects across and above the cover 9. Said casing 15 is also provided at its lower end with a large opening 18.

Figure 3:
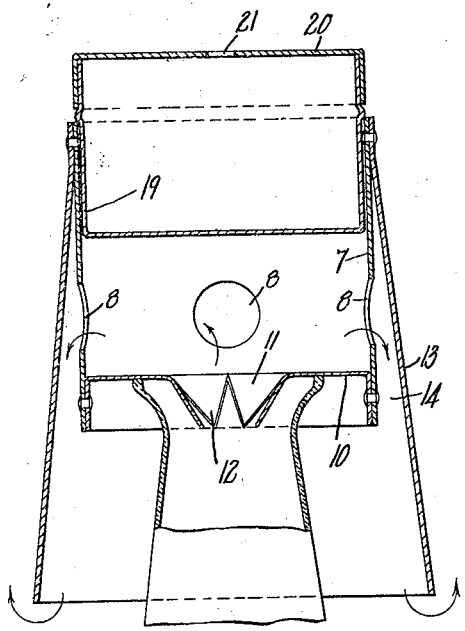
Fig. 3 is a sectional elevation, similar to Fig. 2, illustrating a cover adapted to receive articles of food when it is desired to use the device for cooking purposes.

In Fig. 3 I have illustrated my invention as adapted to cook articles of food as well as for heating purposes and, in this figure, 19 is a receptacle for food provided with a cover 20 which cover has a hole 21 therein, to allow steam or heated vapor to pass out of said receptacle.

It will be seen that the receptacle 19 takes the place of the cover 9 illustrated in Fig. 2 and is adapted to fit inside the cylinder 7, so that said receptacle 19 serves a two-fold purpose, namely, that of a cover for the cylinder 7 and frusto-conical casing 13 and also as a receptacle for food to be cooked.

The general manner of use and operation of the different forms of my invention hereinbefore described are as follows:

In the form of my invention illustrated in Fig. 1, the cylinder 7 is placed upon the lamp chimney 6 with the prongs 12 projecting downwardly into said lamp chimney and the heated gases pass upwardly through the lamp chimney and through the opening 11 into the cylinder 7 and outwardly through the holes 8, thus heating the cylinder and also the top 9 whereby the temperature of the room in which the device is located is increased. In this form of my invention, it will be seen that the device does not in any degree detract from the illuminating feature of the lamp.

In the form of my invention illustrated in Fig. 2, the heated gases, after they have passed through the holes 8, pass into the chamber 14 between the cylinder 7 and the frusto-conical casing 13, thence they pass downwardly and outwardly around the bottom of the frusto-conical casing and thence pass upwardly between said frusto-conical casing and the outer casing 15. Fresh air enters the casing 15 through the opening 18 and mixing with the heated gases from the frusto-conical casing 13, passes upwardly between said casing and out of the casing 15 through the holes 16.

The form of my invention illustrated in Fig. 3 is obtained by removing the cover 9 from the top of the frusto-conical casing 13 as illustrated in Fig. 2 and substituting in its place the receptacle 19 with its cover 20, provided with a hole 21, said receptacle 19 being of such size as to fit the interior of the cylinder 7 and of such a height that the bottom of the receptacle 19 is located above the holes 8 when in position. The receptacle cover 19 may be used for cooking potatoes and other articles of food.

I claim:

1. A heating device for lamp chimneys comprising a hollow cylinder, provided with a plurality of holes, a cover therefor and a horizontal partition extending across the interior of said cylinder below said holes and provided with a centrally-disposed opening surrounded by downwardly projecting prongs adapted to be inserted in the chimney of a lamp.

2. A heating device for lamp chimneys comprising a hollow cylinder, provided with a plurality of holes, a cover therefor, a horizontal partition extending across the interior of said cylinder below said holes and provided with a centrally-disposed opening surrounded by downwardly projecting prongs adapted to be inserted in the chimney of a lamp and a hollow frusto-conical casing surrounding said cylinder, the upper ends of said cylinder and casing being fastened together whereby a chamber is formed therebetween.

3. A heating device for lamp chimneys comprising a hollow cylinder, provided with a plurality of holes, a cover therefor, a horizontal partition extending across the interior of said cylinder below said holes and provided with a centrally-disposed opening surrounded by downwardly projecting prongs adapted to be inserted in the chimney of a lamp and a hollow frusto-conical casing surrounding said cylinder, the upper ends of said cylinder and casing being fastened together whereby a chamber is formed therebetween, the lower end of said casing projecting below said cylinder to a substantial extent.

4. A heating device for lamp chimneys comprising a hollow cylinder, provided with a plurality of holes, a cover therefor, a horizontal partition extending across the interior of said cylinder below said holes and provided with a centrally-disposed opening surrounded by downwardly projecting prongs adapted to be inserted in the chimney of a lamp, a hollow frusto-conical casing surrounding said cylinder, the upper ends of said cylinder and casing being fastened together whereby a chamber is formed therebetween, the lower end of said casing projecting below said cylinder to a substantial extent and an outer casing surrounding said frusto-conical casing and cylinder, the bottom of said outer casing projecting below the bottom of said frusto-conical casing and adapted to rest upon a stationary support, the top of said outer casing extending over the top of said cylinder, said outer casing being provided with an opening adjacent the bottom thereof and with openings adjacent its upper end.

5. A heating device for lamp chimneys comprising a hollow cylinder provided with a plurality of holes, a receptacle constituting a cover therefor and a horizontal partition extending across the interior of said cylinder below said holes and provided with a centrally-disposed opening surrounded by downwardly projecting prongs, adapted to be inserted in the chimney of a lamp.

In testimony whereof I have hereunto set my hand in presence of two subscribing witnesses.

LEWIS B. TEBEAU.

Witnesses:
MINNIE B. HILAND,
MARJORIE KNIGHT.